(12) United States Patent
Feller

(10) Patent No.: US 6,571,642 B1
(45) Date of Patent: Jun. 3, 2003

(54) MAGNETIC FLOW SENSOR WITH ANNULAR SENSING PATH

(76) Inventor: Murray F. Feller, 21577 NW. 75th Avenue Rd., Micanopy, FL (US) 32667

( * ) Notice: Subject to any disclaimer, the term of this patent is extended or adjusted under 35 U.S.C. 154(b) by 0 days.

(21) Appl. No.: 10/098,977

(22) Filed: Mar. 15, 2002

Related U.S. Application Data

(63) Continuation-in-part of application No. 09/704,913, filed on Nov. 2, 2000, now Pat. No. 6,463,807.

(51) Int. Cl.[7] .................................................. G01F 1/58
(52) U.S. Cl. ..................................................... 73/861.12
(58) Field of Search ........................ 73/861.12, 861.14, 73/861.16, 861.17, 861.15

(56) References Cited

U.S. PATENT DOCUMENTS

| | | | | |
|---|---|---|---|---|
| 3,906,415 A | * | 9/1975 | Baker | 200/214 |
| 4,658,652 A | * | 4/1987 | Picone et al. | 73/861.12 |
| 4,726,236 A | * | 2/1988 | Wada | 73/861.12 |
| 4,938,073 A | * | 7/1990 | Stephenson | 73/861.12 |
| 5,773,723 A | * | 6/1998 | Lewis et al. | 138/133 |

* cited by examiner

Primary Examiner—Hezron Williams
Assistant Examiner—Jewel V. Thompson
(74) Attorney, Agent, or Firm—David Kiewit

(57) ABSTRACT

Magnetic flow meters having a streamlined body within a flow tube provide an extended voltage path through a flowing fluid at the expense of flow passage restriction. The voltage path may extend along a circumference of an annular flow region. The use of an extended voltage sensing path increases useful signal levels, which allows for lower cost construction and lower power operation.

7 Claims, 2 Drawing Sheets

MAGNETIC FLOW SENSOR WITH ANNULAR SENSING PATH

This application is a continuation-in-part of the inventor's application U.S. Ser. No. 09/704,913, filed Nov. 2, 2000, and now issued as U.S. Pat. No. 6,463,807.

FIELD OF THE INVENTION

This invention relates to apparatus and method for determining the rate of flow of a fluid by measuring the electrical potential difference developed in the fluid as the fluid moves through a magnetic field.

BACKGROUND INFORMATION

In prior art in-line magnetic flow meters, the electrical potential difference developed in the fluid is generally sensed by a pair of electrodes contacting the liquid and spaced apart from each other by the diameter of a round flow sensing passage. A magnetic field generated orthogonal to both the axis between the electrodes and the direction of flow through the sensing passage is provided by two coils of wire located on opposite sides of and outside of the passage. Sophisticated electronics are used to energize the magnetic field, amplify the tiny flow-related signals generated, and reject various noise and drift signal components which would otherwise degrade measurement precision. These meters are characterized by an unobstructed flow passage offering very low pressure drop and high tolerance to solids in the fluid, high measurement precision, high power consumption, and high cost.

In a water metering application for irrigation, where only moderate flow rates are experienced, an unobstructed flow passage is relatively unimportant, but low cost and low power consumption for stand alone battery operation are very important. It is therefore an object of the invention to provide the basis for magnetic flow sensors which, at the expense of flow passage restriction, offer advantages of improved measurement precision, reduced operating power and lower costs.

BRIEF SUMMARY OF THE INVENTION

Various of the above and other objects are attained by magnetic flow sensors made or operated in accordance with various preferred embodiments of the present invention. In one preferred embodiment a magnetic flux generated by two electromagnets having magnetic cores is redirected by magnetic pole pieces so as to be orthogonal to both the axis between the electrodes and to a fluid flow direction. As is known in the magnetic flow metering art, the flux will generate, in the moving fluid, voltage differences proportional to the flow rate of the fluid, the magnitude of the flux and the length of the conductive path between the electrodes. These voltage differences are sensed by at least one, and preferably two pairs of electrodes arranged so that one pair is associated with each location of the pole pieces. In this embodiment, one of the electromagnets is located in a streamlined housing centered within the flow passage so as to confine the flow to a quasi-annular ring, and the other electromagnet is on the outside of the passage. The pole pieces from the two magnets are located a selected distance apart and are aligned to reinforce their radial flux through the annular flow passage at two locations along the flow axis, thereby forming a complete magnetic circuit. At each location of these paired poles, a pair of electrodes is located to sense the corresponding flow generated voltages. An electrically insulating barrier may be used both to provide mechanical support for the housing and electrodes, and to electrically isolate the paired electrodes so that the quasi-annular flow passage provides substantially the only electrical path between those electrodes. That is, flow signals are generated along a circumferential path lying between the streamlined body and the tube. In preferred embodiments, one pair of electrodes is located far enough from the other pair so that their signals have low mutual interaction. This provides a combination of an increased fluid flow velocity, a longer path between electrodes and a highly efficient magnetic circuit. These features enable a magnetic flow sensor to be produced having substantially greater flow-generated signals than is found in the prior art.

The presence of a streamlined housing within a flow passage reduces the cross sectional area of the flow passage and thereby increases the fluid flow rate at the expense of an increased pressure drop. At a fixed magnetic flux in the passage, the increased flow rate produces correspondingly higher electrode voltages than would be measured if the body were not there. Moreover, use of magnetic cores with pole pieces to provide a complete, shielded magnetic circuit concentrates the magnetic flux in the desired area. This arrangement enables a higher magnetic circuit efficiency to be achieved than is the case with commonly used air core magnets. Additionally, the magnetic field is generally confined to the annular flow passage in order to reduce problems of magnetic and electromagnetic compatibility. The use of magnetic cores and pole pieces with prior art magnetic flow meters is generally not practical in larger pipe sizes because the orientation of the field would require a relatively large mass of core material that would increase the size and weight of the meters considerably.

In a preferred flow sensing embodiment, each electrode pair may be used with its own signal amplifying and processing circuitry to provide a flow rate signal. Alternately, signals from multiple pairs may be combined in various ways to provide redundancy and improved measurement precision. Each electrode pair may also be stabilized by short-circuiting the two electrodes of the pair together, or otherwise connecting both of the two electrodes to a common potential during the period when the magnetic field is not present, thereby further helping to reduce measurement errors, Although it is believed that the foregoing recital of features and advantages may be of use to one who is skilled in the art and wishes to learn how to practice the invention, it will be recognized that the foregoing is not intended to list all of the features and advantages. Moreover, it may be noted that various embodiments of the invention may provide various combinations of the hereinbefore recited features and advantages of the invention, and that less than all of the recited features and advantages of the invention may be provided by some embodiments.

DETAILED DESCRIPTION OF THE INVENTION

Figure 1:
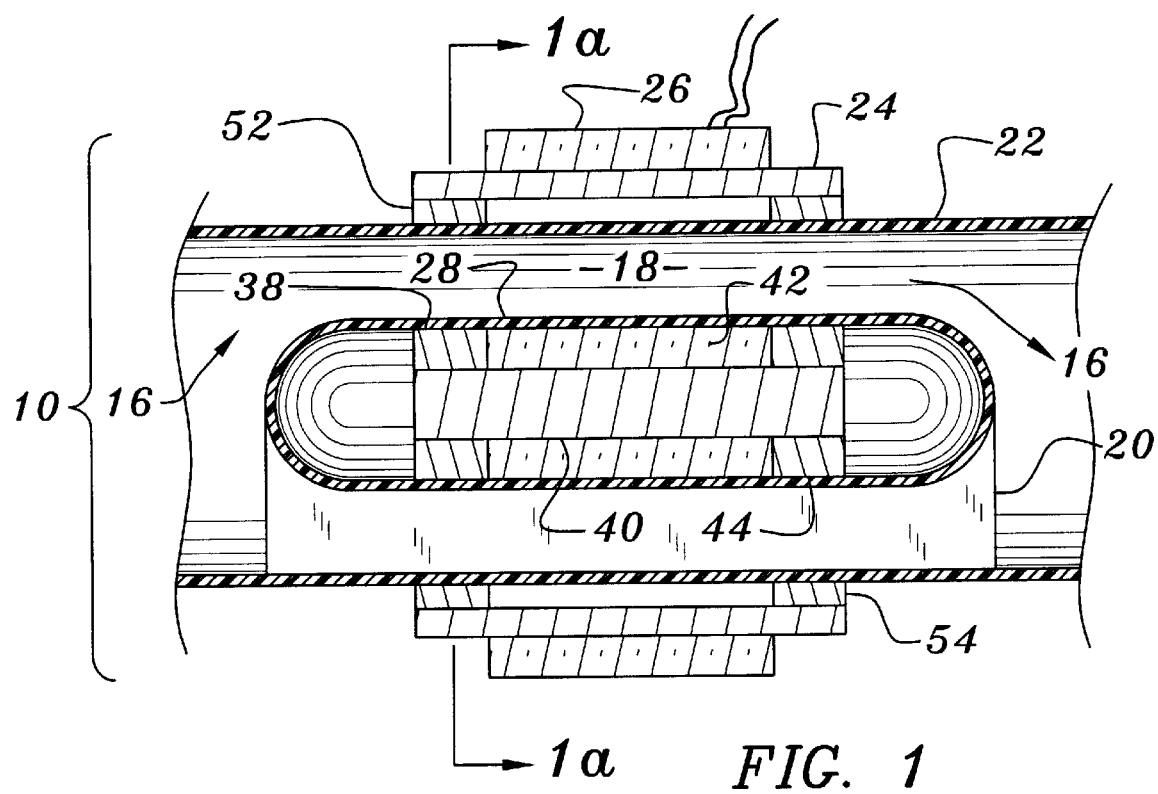
FIG. 1 is a side cross sectional view of a magnetic flow sensing configuration in accordance with a preferred embodiment of the present invention.
Figure 1A:
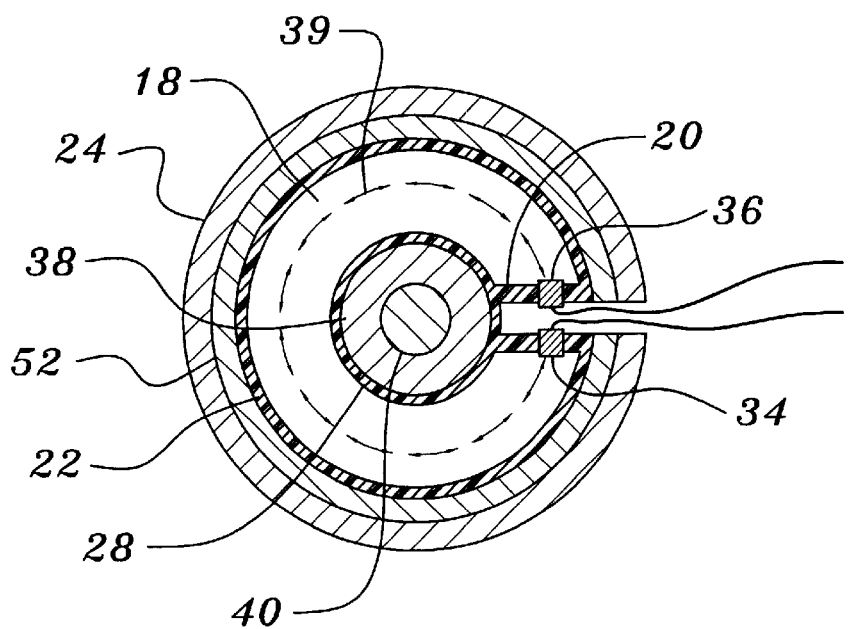
FIG. 1a is a sectional end view of the configuration of FIG. 1 along lines 1a—1a illustrating the quasi-annular flow ring.

A magnetic flow meter 10 made according to a preferred embodiment of the invention is shown in an axial cross sectional view in FIG. 1. An end cross sectional view of the same device, taken as indicated by the double-headed arrow 1a—1a in FIG. 1, is depicted FIG. 1a. In this embodiment a tube 22 provides an electrically insulating cylinder confining the fluid 18 that is flowing as indicated by arrows 16. Inside, and generally centered within a selected portion of the tube 22, is an electrically insulating streamlined housing 28 containing inner ring pole pieces 38, 44, a center core 40, and an inner magnet winding 42. A vane 20 provides a preferred mechanical connection between the tube 22 and a housing 28. The vane 20 is also used for mounting paired electrodes 34, 36 at selected axial position within the selected portion of the tubes so that they are centered with respect to the first ring pole piece 38. The electrodes will make contact with whatever fluid 18 flows through the tube but will otherwise be electrically insulated from each other. The electrodes 34, 36 are thus arranged to measure a voltage difference occurring along an elongated circumferential path 39 within the quasi-annular space defined between the tube 22 and the combination of the vane 20 and streamlined body 28 inserted thereinto. Another similarly configured pair of electrodes 46, 48 is symmetrically located with respect to the second ring pole piece 44. In addition, two outer ring pole pieces 52, 54 are disposed between the tube 22 and an outer cylindrical core 24 which has an outer magnet winding 26 wrapped around it. Slots and holes (not shown) are provided in the various components to enable electrical connections to be made to the electrodes and to the inner magnet winding 42.

It will be recognized that if the vane were not present (e.g., if the streamlined body were supported in the middle of the tube by means of a support member downstream of the measurement region), the fluid would flow in an annular region defined by the streamlined body and the inner wall of the tube. In the preferred embodiments, the presence of the vane converts the annular region into a quasi-annular, or substantially annular region. Moreover, it will be recognized that a variety of diameters and lengths can be chosen for the streamlined body, which can extend beyond the selected portion of the tube in which the flow measurement is made.

In operation of a preferred flow meter the two coils 42, 26 are energized at the same time to produce magnetic flux of opposite polarity at the ends of their cores 40, 24. A first pair of inner and outer ring pole pieces 38, 52 provide a low reluctance path and radially concentrate the magnetic flux in a quasi-annular ring of the fluid axially aligned with a first pair 34, 36 of electrodes. The second pair of pole pieces 44, 54 is correspondingly associated with a second pair 46, 48 of electrodes. In comparison to prior art magnetic flow meters, the average distance between electrode pairs can be easily made much greater, the magnetic flux can be easily concentrated in the region used for generating flow-related electrode voltages and the flow velocities can be made relatively high. As a result, the generated electrode voltages are relatively high, thereby enabling advantageous tradeoffs to be made. For example, electrode signal amplification and processing may be simplified because larger signals with greater immunity to noise and interference are available. Moreover, the power supplied to the electromagnets may be reduced in order to lower the overall power requirements of the meter, thereby making it more practical for self-powered and loop power applications.

The magnetic flow sensor 10 illustrates a configuration for achieving large flow-related signals at the electrodes and overall good performance. This configuration may be modified to gain certain advantages at the expense of others. For example, to simplify mechanical construction an embodiment of the invention could be made with only an external coil 26. In a version such as this, the streamlined housing 28 might contain only the annular ring pole pieces 38, 44, and the core 40 for concentrating the flux in the region used for generating flow related electrode voltages, but not include the winding 42. In another approach aimed at reducing size and weight of the meter, the external winding 26 may be eliminated so that all of the flux is produced from the internal winding 42. In addition to the winding 26, the outer ring pole pieces 52, 54, and the cylindrical core 24 could also be eliminated to enable a particularly small, low cost and lightweight magnetic flow meter for a selected pipe size.

Figure 2:
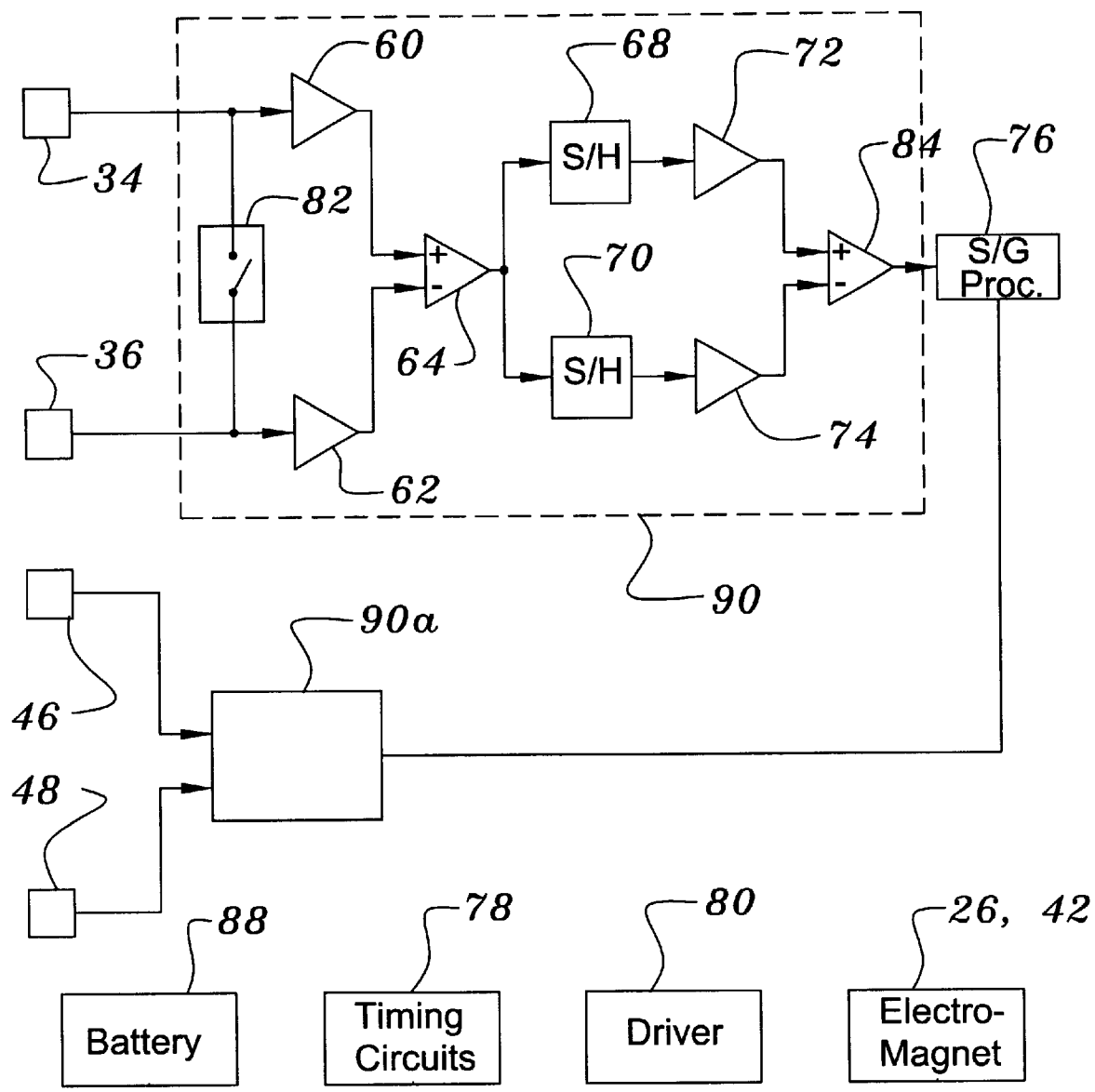
FIG. 2 is a schematic block diagram of an electronics circuit in accordance with a preferred embodiment of the present invention.

Turning now to FIG. 2, one finds a simplified block diagram of preferred electronic circuitry used with the magnetic flow sensor 10. The electrodes 34 and 36 provide two input signals to a signal amplification circuit block 90, which is used to perform signal amplification and filtering functions. A switch 82, which may be an electro-mechanical relay, a solid state relay, or any one of many other electrically controllable switching elements known in the art, may be arranged to selectively connect the two electrodes during non-measurement intervals. One of the electrodes 34 is also connected to a first input amplifier 60 and the second electrode 36 is connected to a second input amplifier 62. The outputs from the two input amplifiers 60, 62 are fed to a first differential amplifier 64. The output from the first differential amplifier 64 is fed to two sample and hold circuits 68, 70 that have outputs to respective buffer amplifiers 72, 74 that, in turn, provide inputs to a second differential amplifier 84. The output from the second differential amplifier 84 is input to a signal processor 76. Signals from the second pair of electrodes 46, 48 are supplied to a signal amplification circuit block 90a which is a duplicate of the signal amplification circuit block 90 and which also provides its output signal to the signal processor 76. Other circuit elements required for operation of the sensor of the invention are generally conventional and include timing circuits 78 and driver circuits 80 used to energize the electromagnet windings 26, 42. In some embodiments of the invention the circuitry also comprises a battery 88 or other exhaustible electric energy source.

During the course of a cycle of operation, the timing circuits 78 provide a short duration drive pulse (e.g., five milliseconds), to the driver 80 which, in turn, supplies a constant current during a portion of the drive pulse's duration (e.g., two milliseconds) to the electromagnet coils 26, 42. The signals corresponding to the voltages generated in the fluid 18 responsive to both its flow rate and to the magnetic flux from the coils 26, 42 appear at sensing electrodes 34, 36 and are fed to respective input amplifiers 60 and 62. The difference between these amplified signals is extracted by the first differential amplifier 64 and output to the sample and hold circuits 68, 70. The timing circuits 78 provide a first sample pulse to enable the first sample and hold circuit 68 during a portion (e.g., one millisecond) of the interval in which the driver is supplying its constant current output. This selection of a shorter sampling interval allows for circuit tolerances and drifts as well as for amplifier circuit settling. The output from the first sample and hold 68 is buffered by its associated amplifier 72 and is then provided to the positive input of the second differential amplifier 84.

After the magnetic fields produced by the electromagnets 26, 42 have collapsed, the timing circuits 78 provide a relatively long duration pulse—e.g., one hundred milliseconds—to the switch 82 to cause it to short circuit the electrodes 34, 36. The electrodes are shorted together for most of the cycle and any difference in voltage between them, which would have otherwise existed, produces a current between them, which will neutralize their voltage difference. When switch 82 opens its contacts, timing circuits 78 provide a pulse, for example one millisecond wide, to the second sample and hold 70 so that the amplified voltage difference then existing between the first pair of electrodes 34, 36 is sampled, buffered by the associated buffer amplifier 74, and provided to the negative input of the second differential amplifier 84. The output from differential amplifier 84, now representative of the amplified voltage difference between the electrodes 34, 36 for the two conditions of the magnetic field being present and not being present, is an accurate representation of the fluid flow rate and becomes one input to the signal processor 76.

In the foregoing discussion, those skilled in the art will recognize that instead of using a switch 82 to short the electrodes 34, 36 together, one could choose to connect both of those electrodes to a common potential. A flow meter using connections of this sort is specifically taught in the inventor's co-pending application Ser. No. 09/820,057, filed on Mar. 28, 2001. The disclosure of Ser. No. 09/820,057 is herein incorporated by reference. Moreover, it will be recognized that the electrodes 34, 36 could be continuously connected to a signal amplifier, as is common in the prior art.

The combination of the second pair of electrodes 46, 48 and their associated signal amplification block 90a function similarly to the combination of the first pair of electrodes 34, 36 and their associated signal amplification block 90 in order to provide a similar signal to the signal processor 76. As an alternative to the above arrangement, the two electrode pairs 34, 36 and 46, 48 can also time share a single signal amplification block.

The signal processor 76 can be used to integrate its input signals to provide several possible outputs. For example, the processor can sum its input signals to provide a relatively high precision signal having high noise immunity. Alternately, the difference between multiple input signals may be extracted and used as an aid to maintenance by providing redundancy.

There are different ways known in the magnetic flow meter art for energizing the magnetic field and for amplifying and detecting the corresponding electrode signals. For the purpose of describing this invention, single polarity DC pulsing has been used. Bipolar DC pulsing and AC energization, for example, could also be used. In these latter cases the amplifying blocks would have to be modified to include the corresponding signal polarity reversal and other necessary functions.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specifications and claims.

I claimed:

1. Apparatus for measuring the flow rate of a fluid in an electrically insulating tube, the apparatus comprising.
   at least one electro-magnet for providing a radial flux of fixed polarity within a selected portion of the tube during a measurement interval;
   an electrically insulating member extending from an inner wall of the selected portion of the tube to a streamlined body centered within the selected portion of the tube and extending along an axis thereof so as to define a quasi-annular region in which the fluid may flow; and
   at least one pair of electrodes attached, at a selected axial position within the selected portion of the tube, to opposite sides of the electrically insulating member, the at least one pair of electrodes defining a respective at least one voltage generating path extending circumferentially through the quasi-annular region from one electrode in the at least one pair thereof to the other.

2. The apparatus of claim 1 wherein the insulating member comprises a mechanical support for supporting the streamlined body within the tube.

3. The apparatus of claim 1 further comprising a switching device having two states, the switching device directly electrically connecting the two electrodes of the at least one pair thereof to a common potential when in the first state, the switching device connecting a voltage measurement circuit between the two electrodes of the at least one pair thereof when in the second state.

4. The apparatus of claim 1 further comprising a switching device having two states, the switching device directly electrically connecting the two electrodes of the at least one pair thereof to each other when in the first state, the switching device connecting a voltage measurement circuit between the two electrodes of the at least one pair thereof when in the second state.

5. The apparatus of claim 1 comprising two electro-magnets, a first of the two electro-magnets disposed outside of the tube, the second of the two electro-magnets disposed within the streamlined body.

6. The apparatus of claim 1 comprising two electro-magnets and a plurality of magnetic pole pieces arranged so that that portion of the annular region that is within the selected portion of the tube is within a magnetic circuit.

7. The apparatus of claim 1 comprising two pairs of electrodes axially spaced apart along insulating member, wherein each of the two pairs of electrodes define a respective voltage generating path extending circumferentially through the substantially annular region.

* * * * *